United States Patent
Krone et al.

(10) Patent No.: US 6,837,034 B1
(45) Date of Patent: Jan. 4, 2005

(54) HARVESTING EQUIPMENT

(75) Inventors: Bernard Krone, Spelle (DE); Wilhelm Ahler, Stadtlohn (DE); Alfons Keller, Mettingen (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 10/018,306

(22) PCT Filed: Jul. 19, 2000

(86) PCT No.: PCT/EP00/06913

§ 371 (c)(1),
(2), (4) Date: Jul. 29, 2002

(87) PCT Pub. No.: WO01/05219

PCT Pub. Date: Jan. 25, 2001

(30) Foreign Application Priority Data

| Jul. 19, 1999 | (DE) | 199 33 778 |
| Jul. 19, 1999 | (DE) | 199 33 780 |
| Jul. 19, 1999 | (DE) | 199 33 777 |
| Sep. 30, 1999 | (DE) | 199 47 288 |
| Oct. 26, 1999 | (DE) | 199 51 636 |
| Oct. 26, 1999 | (DE) | 199 51 459 |
| Nov. 1, 1999 | (DE) | 199 52 566 |

(51) Int. Cl.$^7$ .......................................... A01D 45/02
(52) U.S. Cl. ................................ 56/51; 56/14.3
(58) Field of Search ...................... 56/93, 51, 14.3, 56/92

(56) References Cited

U.S. PATENT DOCUMENTS

| 3,894,382 A | * | 7/1975 | Jauss ......................... 56/17.3 |
| 4,771,592 A | * | 9/1988 | Krone et al. ................ 56/14.3 |
| 5,040,362 A | * | 8/1991 | Morgan et al. .............. 56/93 |
| 6,032,444 A | * | 3/2000 | Herron et al. ............... 56/60 |

FOREIGN PATENT DOCUMENTS

EP  541173 A1  * 11/1992  ................. 56/93

OTHER PUBLICATIONS

Agronomy Advice, Joe Lauer, Sep. 1996, http://corn.agronomy.wisc.edu.*

* cited by examiner

Primary Examiner—Thomas B. Will
Assistant Examiner—Alicia Torres
(74) Attorney, Agent, or Firm—Jordon and Hamburg LLP

(57) ABSTRACT

Harvesting equipment (1) for harvesting corn or similar stalk-like harvested products, the harvesting equipment (1) having at least one link chain (4; 5), which is provided with holding means for the cut-down harvested products (3), and has a tight side (4a; 5a) which can be moved, when in use, transversely to the driving direction (F) of the harvesting equipment (1), is constructed so that the extent (T) of an element (14, 15) of the link chain (4; 5), measured in the revolving direction (U1; U2), essentially corresponds to a whole number divider of a standard distance between rows (3a) of harvested products (3) cultivated, in a standardized manner.

12 Claims, 4 Drawing Sheets

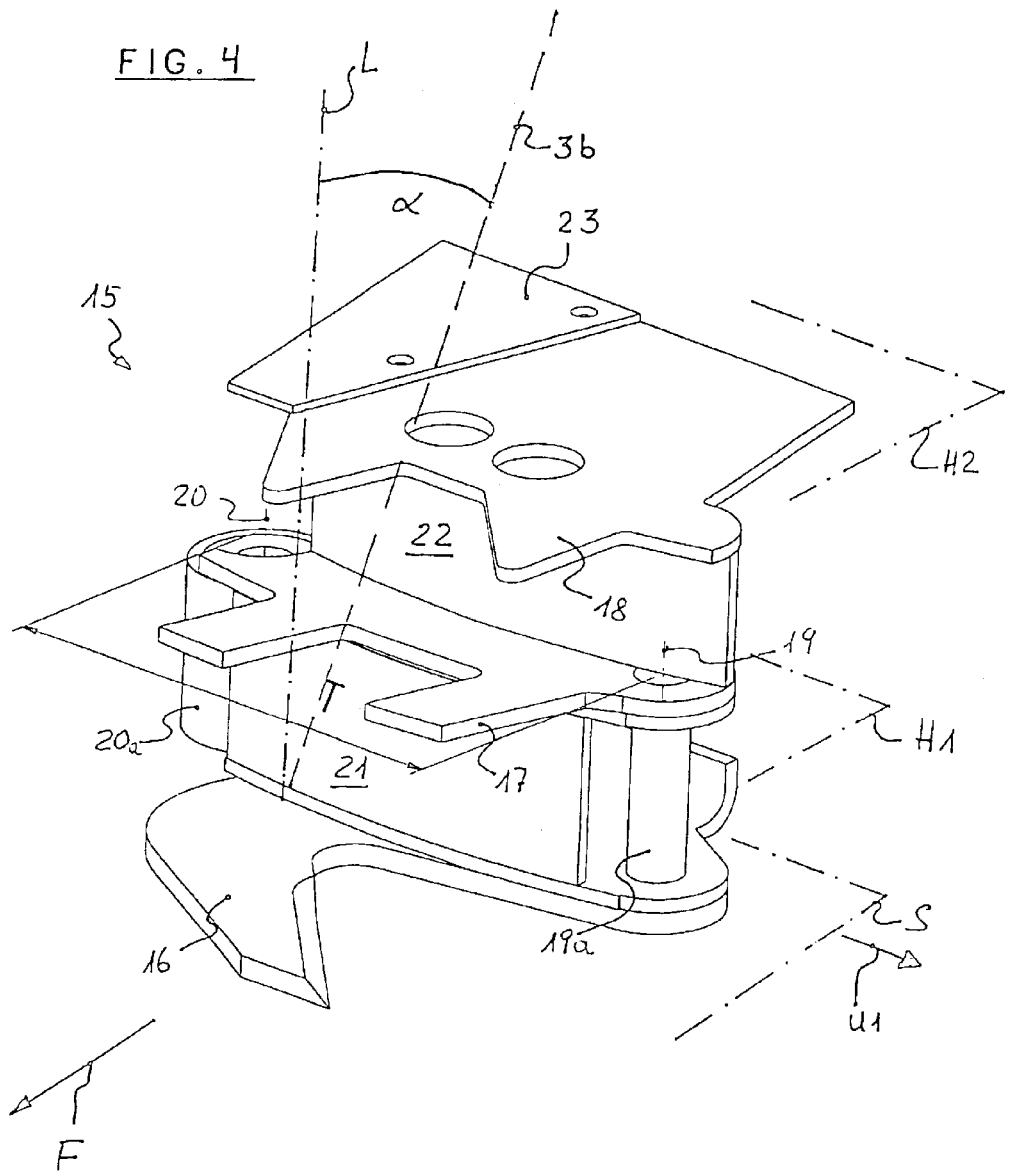

//HARVESTING EQUIPMENT

BACKGROUND OF THE INVENTION

Figure 1:
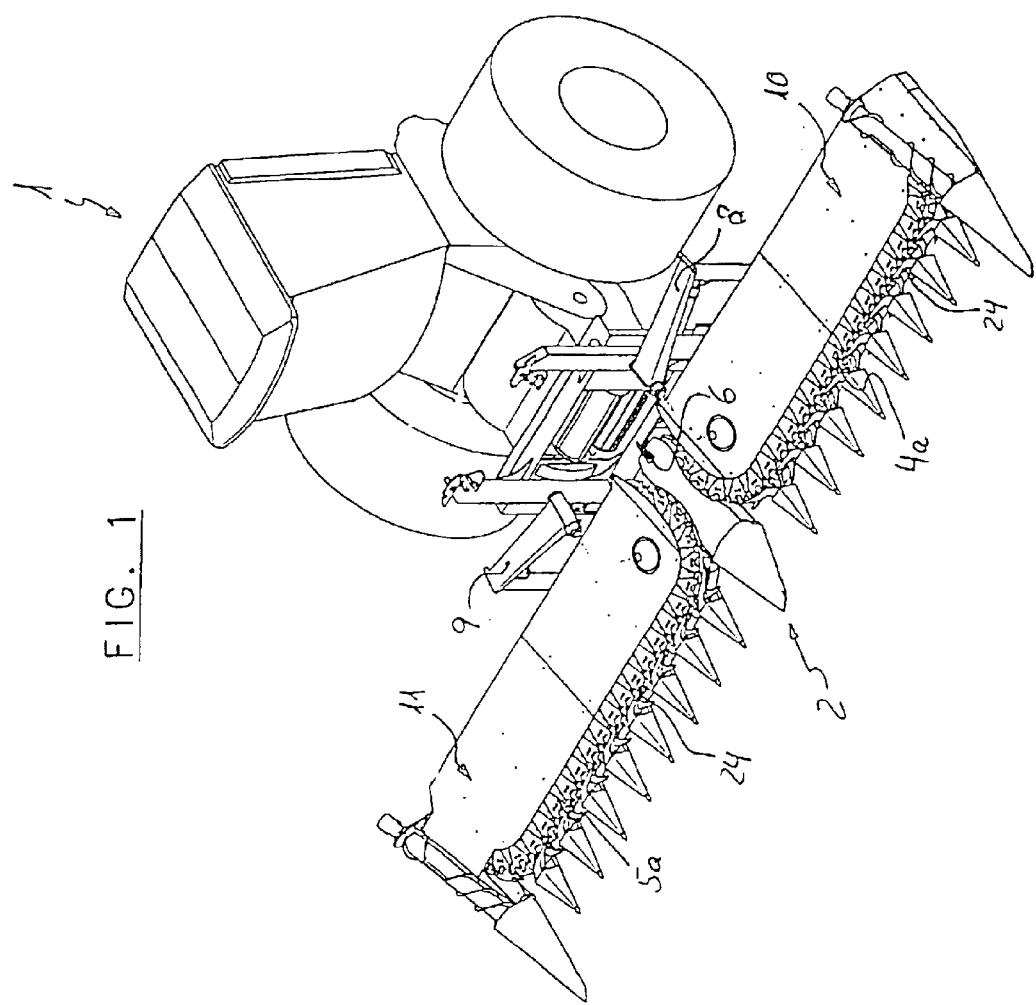

The invention relates to harvesting equipment for harvesting corn or similar stalk-like harvested crops.

The DE 33 24 899 C2 discloses generic harvesting equipment, for which the harvested crops are cut off by cutting tools suspended in a flat link articulated chain and conveyed by holding means, which are furthermore suspended in the flat link articulated chain, to an inlet opening of a chopper or the like. Such conveying chains are subject to the danger of blockage by harvested crops engaging between the flat links. These chains are therefore subjected to considerable wear. Moreover, the maintenance and exchange of chain elements is made more difficult by the superimposed cutting and holding tools.

SUMMARY OF THE INVENTION

It is therefore an object of the invention to improve the ease of maintaining and handling such harvesting equipment. Pursuant to the invention, this objective is accomplished by harvesting equipment with the distinguishing features of claims 1 and 3, which can be realized individually or, particularly advantageously, in combination. With regard to further, advantageous developments, reference is made to claims 2 and 4 to 10.

With the harvesting equipment of claim 1, a simple modification to adapt to different working widths of the harvesting equipment is possible. To enlarge the working width, that is, to take hold of further adjacent rows of harvested products, the frame must be lengthened by the corresponding additional width, for example, by 75 cm for one row and, in conformity herewith, the link chain must be lengthened by the corresponding number of chain elements. At the same time, because the ratio of division is a whole number, it is ensured that the link chain always assumes any length, which is matched accurately to the standard distance. By these means, overdimensioning or underdimensioning of the link chain is avoided. The standard distance may be measured between two or between three adjacent rows. A link chain, the elements of which, in their longitudinal extent, form a whole number divider of twice the distance between rows, therefore also fulfills the inventive function. If, for example, the standard distance between two rows corresponds to four times the extent of the chain elements, four intermediate elements, that is, a total of one supplementary piece with eight chain elements, must be inserted to broaden the harvesting equipment by the width of one row for the front and rear side of the revolving link chain. Whenever a chain is widened, it must also be lengthened by an amount corresponding to twice the desired widening of the tight side. Therefore, in the case of a chain element extension, which corresponds to whole number divider of twice the distance between rows, the widening by the distance between two rows is also always connected with adding a whole number of chain elements. Of course, this also applies to a widening by the distance between two rows.

If the chains elements are constructed as a uniform function body, which is provided directly with outwardly pointing holding means, the danger of blockage of the chain is reduced appreciably, since stalks or similar harvested crops cannot collect in the open spaces between the links of a chain or between these and suspensions of holding or cutting means. In addition, all elements of a chain are constructed uniformly. As a result, it becomes easier to widen or shorten the chain in accordance with claim 1. Additional, function elements do not have to be mounted.

Wear is particularly low if the chain elements, in their extent, have deflection plates, which prevent penetration of harvested crops in the spaces between the chain from the front side, which is moved against the harvested crops.

If the chain elements have several holding planes, and the upper holding plane, with the upper deflection plate, is offset inward with respect to the lower holding plane counter to the direction of travel, it is achieved that on the front tight side of the link chain, the cut off stalks are at an angle, so that these, inclined to the rear, are supplied to the inlet opening of the chopping device or the like and cannot fall out of the cutter bar towards the front.

Further advantages, distinguishing features arise out of an example of an object of the invention, which is illustrated in the accompanying drawings.

Figure 2:
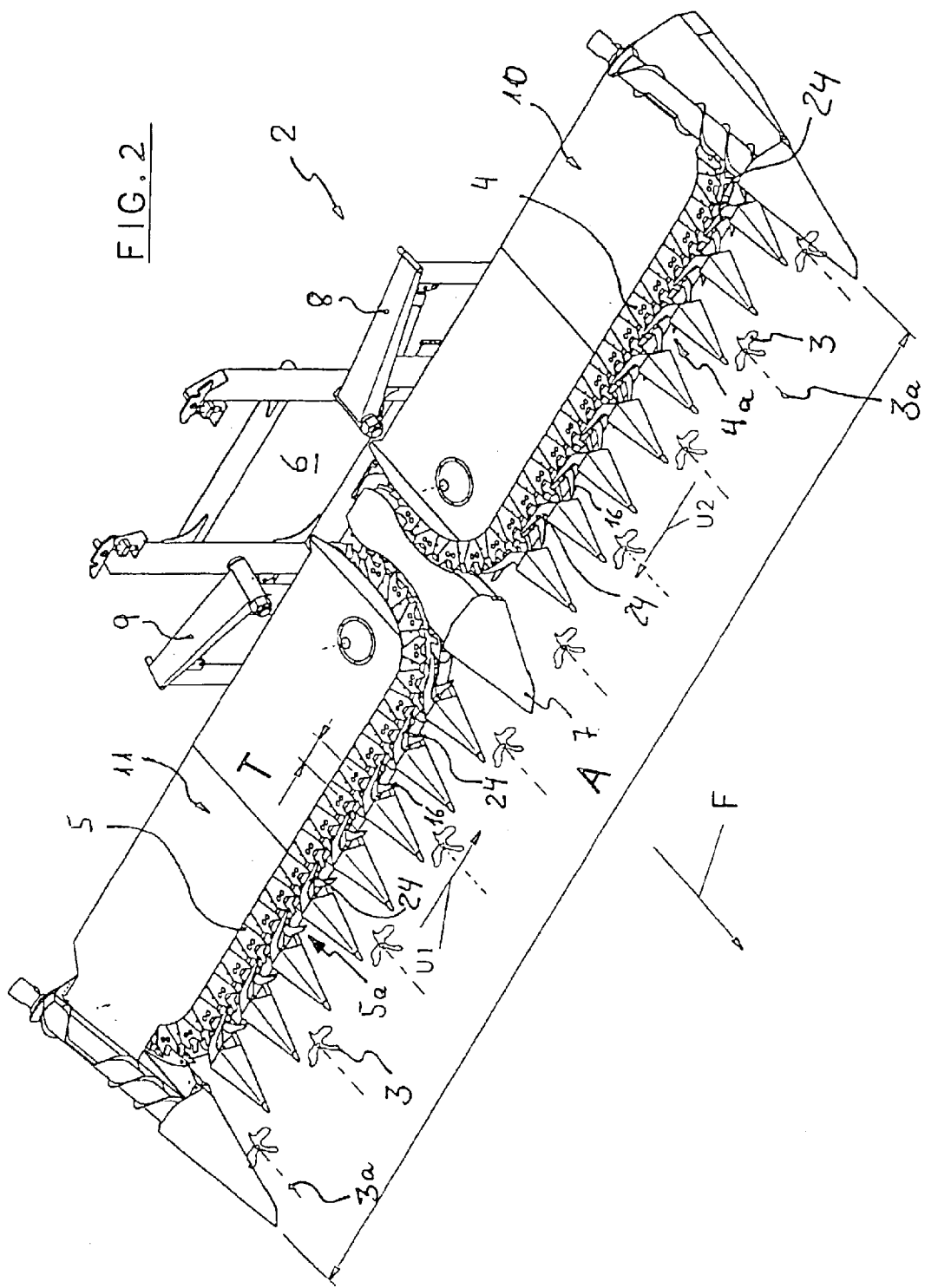
Figure 3:
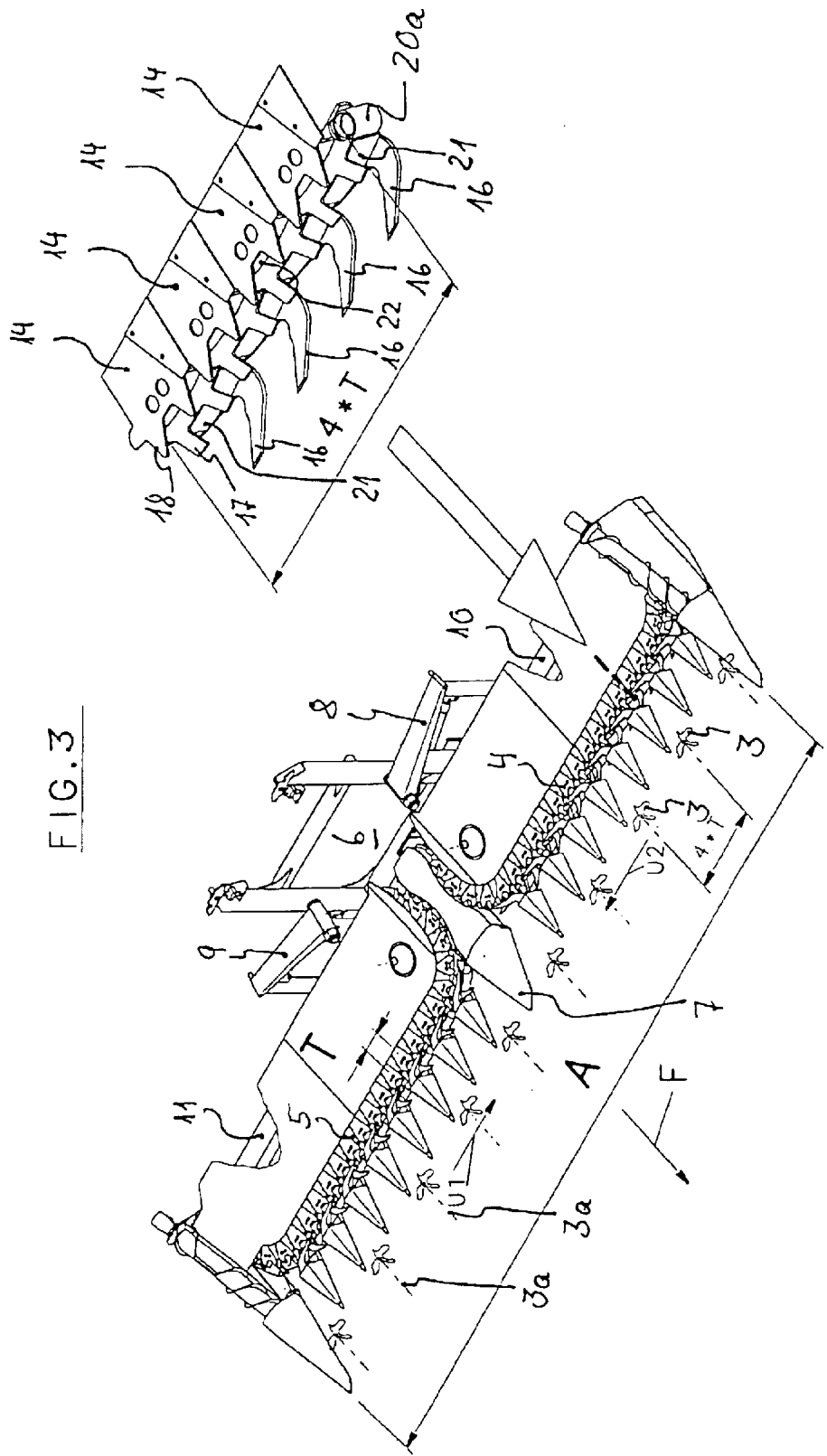

Further advantages and distinguishing features arise out of an example of an object of the invention, which is illustrated in the drawing, in which FIG. 1 shows a perspective view of inventive harvesting equipment with two link chains revolving in opposite directions in an attachment, FIG. 2 shows a perspective view of the attachment FIG. 3 shows a view similar to that of FIG. 2, with a portion of a link chain, which is enlarged even further, and FIG. 4 shows a single chain element forming a uniform function body.

DESCRIPTION OF THE PREFERRED EMBODIMENTS

According to the example, the harvesting equipment 1 is constructed as a self-propelled vehicle and comprises an attachment 2, which takes up the harvested crop 3 over two link chains 4, 5 and supplies it to an inlet opening 6 of a chopper or a different device, which processes it further. The link chains 4, 5 run in the directions of the arrows U1 and U2 with their tight side 4a or 5a on a vertical, longitudinal center plane of the harvesting equipment. With that, a strip of harvested products can be harvested with a harvesting equipment 1 can also be used equally well independently of rows. As a rule, however, corn fields are planted and harvested in rows. This offers the advantage that automatic steering can be used for the harvesting equipment 1, which identifies the position of the rows 3a and guides the harvesting equipment 1 correspondingly. Moreover, when corn is harvested, an accumulation of soil may be found in the area of the corn rows 3a, which, when driven over obliquely, leads to an erratic operation of the harvesting equipment 1. Because of the depressions between the rows 3a of harvested products, a constant height of cutting cannot be guaranteed when harvesting obliquely or transversely to these rows. The danger exists that the cutting and drawing-in equipment comes into contact with the ground and, as a result, takes up soil and dirt, drawing them into the equipment, or that the corn plants art cut off too high.

Between the link chains 4 and 5, a divider point 7 is provided, which brings about a rejection of central harvested products rows 3a to the lateral link chains 4 and 5, by means of which the harvested products 3, on the one hand, are cut off and, on the other, conveyed to the inlet opening 6 of the equipment for processing them further. The link chains 4 and 5 are held in frames 10, 11. The frames, as a whole, can be swiveled by means of supporting frames 8, 9 around axes of rotation, which extend parallel to the longitudinal axis of the vehicle. By these means, they are swiveled from the operating position, in which they are parallel and lie essentially horizontally next to one another, into an essentially vertical transporting position.

In the operating position, the total working width is labeled A. The link chains 4, 5 comprise chain elements 14, 15, which are constructed in each case as uniform function units and have cutting means 16 and/or holding means 17, 18. Since the chains 4 and 5 in each case convey towards the center, that is, have opposite conveying directions an U1 and U2, the chain elements 14 are correspondingly also mirror images of the chain element 15. This is particularly important for the cutting means 16, which are constructed in the example as hook-shaped knives, the cutting taking place in the inner curvature of the hook. The holding means 17, 18 are also set at an angle, in order to make a laterally inclined transport of the severed stalks possible by these means. In the example, the chain elements 14, 15 have a cutting plane S, which is provided with cutting means 16, as well as a first holding plane H1, which is provided with holding means 17, and a second holding plane H2, which is provided with holding means 18. The chain elements 14, 15 are constructed uniformly in each case, that is, the holding and/or cutting means 16, 17, 18 are components of the chain elements 15 and not only connected detachably to these as attachable pieces.

The function bodies 14 and 15 adjoin one another directly. An axle shaft 19*a*, which can be embraced by a sleeve body 20*a* at the other end of the next function body 14, 15, is formed at one end of a function body 14, 15. By avoiding a space between the chain elements 14, 15, contamination and blockage of this joint region is prevented. The chain elements 14, 15 have deflection plates 21, 22, which follow their extent T in the revolving direction U1 and U2 and are essentially vertical or slightly inclined and which shield the function body 14, 15 towards the front, that is in the traveling direction F, in which the tight side 4*a* or 5*a* of the link chains 4 or 5 meets the harvested products 3. The deflection plates 21, 22 extend, on the one hand, between the sleeve body 20*a* and a further sleeve body 20*a* of an adjacent element 14, 15, which embraces the axle shaft 19*a* essentially over the whole surface, in order to be able to prevent reliably any penetration of harvested products also in the region of the axes of rotation 19, 20. The deflection plates 21, 22 can be constructed as metal plates and fixed exchangeably over a screw or plug-in connection. Welding also comes into consideration. Likewise, the chain elements 14, 15 can be constructed as uniform cast parts. The lower deflection plate 21 is disposed between the cutting plane S and the first holding plane H1 with the holding means 17 and the upper deflection plate 22 is disposed between the holding plane H1 and the holding plane H2 with the holding means 18. Such a function body 15, as shown in FIG. 4, forms a unit, which can be exchanged as a whole. The individual holding means 17, 18 or cutting means 16 do not have to be mounted as individual parts on standard chain elements. All chain elements 14 and 15 are similar. Due to the front side shielding by the deflection plates 21, 22 penetration of dirt or harvested products within the chain elements 14, 15 is also prevented, so that the service life of the chain elements 14, 15 is increased. In order to prevent penetration of dirt from above, overlapping metal sheets 23 are provided, which cover a gap between the chain elements in the region of the upper holding means 18. The upper deflection plate 22 is offset counter to the driving direction F inward towards the rear with respect to the lower deflection plate 21. Likewise, the edge region of the holding means 18 is offset with respect to the front edge region of the holding means 17. Even if the attachment 2 is placed at an angle to a plane of rotation of the link chains 4, 5 and this plane consequently rises against the driving direction F, severed stalks 3*b*—shown by broken lines in FIG. 4—can be transported at a greater or lesser slope to the perpendicular L at an angle (x with the driving direction F, so that the stalks 3*b* are largely prevented from toppling out of the harvesting equipment 1 in the driving direction F.

Due to the construction of the chain elements as uniform function bodies, it is also ensured that they can be exchanged easily and the link chain 4, 5 can be lengthened or shortened simply. Particularly in combination with this uniform function body, but also as an individual measure, provisions are made pursuant to the invention that the extent T of an element 14 or 15 of the link chain 4, 5 is a whole number divider of a standard distance between rows 3*a* of harvested products 3 grown under standardized conditions. By these means, the harvesting equipment 1 can be manufactured without a major expense in accordance with customer specifications with regard to different working widths. Aside from lengthening or shortening a frame, it is only necessary to insert or take out the appropriate number of chain elements 14, 15 in accordance with the desired number of rows 3*a*, which are to be harvested. The adaptation is then ensured automatically. If, for example, the width, which is to be harvested, is to be increased by one row, an extension of eight chain elements must be used, for example, for a standardized distance of two rows 3*a*, which corresponds to four times the extent of the chain elements T. These eight chain elements can be assembled previously already as a set and, in that case, only have to be inserted in the chain 4 or 5 as a whole. Correspondingly, after an extension by such a number of chain elements 14, 15, the group of chain elements can also be kept together as a unit. With that, the time, required for the modification, can be shortened and the cost of the installation reduced considerably. Only the two different chain elements 14 and 15 for the left or the right chain 4, 5 have to be kept in stock, so that the warehousing of spare parts is simplified. It is also possible to construct the frames 10, 11 telescopically, so that they can be used for different working widths.

The respective link chains 4, 5 are driven by way of reversing wheels in the edge end regions of the frames 10, 11. In the central region, the chains 4, 5 rest on glide planes, which are formed by the upper sides of counter cutting-edges and during the installation or modification, optionally have to be lengthened or shortened with the frame. However, more extensive guides are not required so that the installation or modification is simplified.

During operation, the stalks of harvested products 3, which are approached, are taken hold of by the angled cutting means 16 and severed between the latter and a counter cutting-edge, which is assigned to the frame 10 or 11. The counter cutting-edge may be stationary or comprise, for example, individual, rotating cutting disks, which are disposed adjacent to one another. The stalks, cut off in this manner, are held between the cutting means 17 and 18 in the inclined position that has been mentioned. Shackles 24 function as outer support at the front, so that the severed stalks are transported between the shackles 24 and the holding means 17, 18 in the revolving direction U1 or U2 to the central region of the supplied counter to the driving direction F between the edge and the holding means 17, 18 of the revolving chain elements of the equipment, in which they are processed further. The cally, in order to achieve flexible distances from the holding

What is claimed is:

1. A harvesting apparatus for stalked plants comprising:
at least one link chain including a tight side which is moved, in use, transversely to a driving direction of the harvesting apparatus, said at least one link chain including a plurality of chain elements articulated to one another, each of said chain elements defining a uniform function body including at least one of outwardly pointing cutting means and holding means for holding cut stalks of the stalked plants provided as an integral part of said uniform function body, each said uniform function body including three planes, a lower one of said three planes being constructed as a cutting plane and a remaining two planes of said three planes lying parallel above being constructed as holding planes for the cut stalks.

2. The harvesting apparatus according to claim 1, wherein each said function body adjoins an adjacent one directly.

3. The harvesting apparatus according to claim 1, wherein each said function body includes deflection plates which are essentially vertical in function and follow an extent of each of the plurality of chain elements in a revolving direction of the link chain.

4. The harvesting apparatus according to claim 3, wherein the deflection plates extend between the axle shafts, surfaces of said deflection plates substantially covering a region therebetween.

5. The harvesting apparatus according to claim 3, wherein
said holding planes include an upper holding plane and a lower holding plane;
a lower deflection plate of the deflection plates is disposed between the cutting plane and the lower holding plane which is disposed above the cutting plane; and
an upper deflection plate of said deflection plates is disposed between said lower holding plane and said upper holding plane.

6. The harvesting apparatus according to claim 5, wherein the upper deflection plate is offset counter to the driving direction relative to the lower deflection plate.

7. The harvesting apparatus according to claim 1, wherein the plurality of chain elements are connected with one another over axle shafts at front and rear ends in a revolving direction of the link chain, and bodies of the axle shaft are embraced in a sealing tanner by sleeve bodies.

8. A harvesting apparatus for stalked plants, comprising:
at least one link chain including a tight side which is moved, in use, transversely to a driving direction of the harvesting apparatus, said at least one link chain including a plurality of chain elements articulated to one another, each of said chain elements defining a uniform function body including at least one of outwardly pointing cutting means and holding means for holding cut stalks of the stalked plants provided as an integral part of said uniform function body, each said function body adjoining an adjacent one directly.

9. A harvesting apparatus for stalked plants, comprising:
at least one link chain including a tight side which is moved, in use, transversely to a driving direction of the harvesting apparatus, said at least one link chain including a plurality of chain elements articulated to one another, each of said chain elements defining a uniform function body including at least one of outwardly pointing cutting means and holding means for holding cut stalks of the stalked plants provided as an integral part of said uniform function body, the plurality of chain elements being connected with one another over axle shafts at front and rear ends in a revolving direction of the link chain, and bodies of the axle shaft being embraced in a sealing manner by sleeve bodies.

10. A harvesting apparatus for stalked plants, comprising:
at least one link chain including a tight side which is moved, in use, transversely to a driving direction of the harvesting apparatus, said at least one link chain including a plurality of chain elements articulated to one another, each of said chain elements defining a uniform function body including at least one of outwardly pointing cutting means and holding means for holding cut stalks of the stalked plants provided as an integral part of said uniform function body, said function body including deflection plates which are essentially vertical in function and follow an extent of each of the plurality of chain elements in a revolving direction of the lin chain.

11. A harvesting apparatus for harvesting stalked plants cultivated in a standardized manner with a standard distance between rows, comprising:
at least one link chain including a tight side which is moved, in use, transversely to a driving direction of the harvesting apparatus, said at least one link chain including a plurality of chain elements articulated to one another and each including holding means for holding cut stalks of the stalked plants, an extent of each of the plurality of chain elements of the link chain as measured in a revolving direction of the link chain corresponding approximately to a whole number divider of a standard distance between the rows, each of said chain elements defining a uniform function body including said holding means provided as an integral part of said uniform function body, said uniform function body further including outwardly pointing cutting means provided as an integral part of said uniform function body.

12. The harvesting apparatus according to claim 11, wherein the standard distance between rows corresponds to approximately four times the extent of each of the plurality of chain elements.

* * * * *